United States Patent [19]

Asanuma et al.

[11] Patent Number: 5,141,547
[45] Date of Patent: Aug. 25, 1992

[54] PROCESS FOR PRODUCTION OF MOLDED GLASS ARTICLE

[75] Inventors: Shigeru Asanuma, Akishima; Shoji Adachi, Hinode; Yasuhiko Kaneko, Sagamihara, all of Japan

[73] Assignee: Nippon Hypox Laboratories Incorporated, Tokyo, Japan

[21] Appl. No.: 657,773

[22] Filed: Feb. 20, 1991

[30] Foreign Application Priority Data

Feb. 28, 1990 [JP] Japan .................. 2-48660

[51] Int. Cl.⁵ ............................................. C03C 21/00
[52] U.S. Cl. ..................... 65/30.1; 65/32.5; 65/64; 65/102; 65/111
[58] Field of Search ............... 65/30.1, 30.12, 32.5, 65/64, 102, 111

[56] References Cited

U.S. PATENT DOCUMENTS

| | | | |
|---|---|---|---|
| 2,958,162 | 11/1960 | Upton | 65/30.1 |
| 3,434,817 | 3/1969 | Hazdra et al. | 65/30.1 X |
| 3,498,802 | 3/1970 | Bickford et al. | 65/30.1 X |
| 4,132,538 | 1/1979 | Eolin et al. | 65/30.1 X |
| 4,976,764 | 12/1990 | Fujino | 65/30.1 |
| 5,032,159 | 7/1991 | Kuwabara et al. | 65/64 |

Primary Examiner—Robert L. Lindsay
Attorney, Agent, or Firm—Nixon & Vanderhye

[57] ABSTRACT

A process for the production of a molded glass article is disclosed, said process comprises the steps of: applying wet treatment to a surface of a lead oxide-containing glass material, thereby forming a hydrated layer having a lower lead oxide content than that of a basic glass; heating the glass material having the hydrated layer; and press-molding the heated glass material. According to the process, a molded glass article having no cloudiness can be obtained and lead is not deposited on the surfaces of the molds used.

2 Claims, 1 Drawing Sheet

PROCESS FOR PRODUCTION OF MOLDED GLASS ARTICLE

BACKGROUND OF THE INVENTION

1. Field of the Invention

The present invention relates to a process for the production of a molded glass article and, particularly, relates to a process for the production of a molded glass article from a glass material containing lead oxide.

2. Description of the Prior Art

Lots of attempts to produce an optical lens and the like with high accuracy without after-treatment such as polishing after press molding have been made in the recent years. One of the molding techniques is a process having the steps of: placing a glass material between upper and lower molds made of metals, cermets, ceramics, etc.; heating the glass material substantially to its glass softening point; and press-molding it. In general, the press molding is carried out in an atmosphere of a non-oxidizing gas such as a nitrogen gas. This reason is in that not only stainless steel and other materials which constitutes a press machine are prevented from oxidizing but also a mirror surface of the molds which contacts with the glass material is prevented from oxidizing in an oxidizing atmosphere. If the surface of the molds which have been polished like a mirror is oxidized, the surface is roughened so that the mirror property thereof is lost.

However, when a glass material containing about 20% by weight or more of lead oxide is press-molded in a non-oxidizing atmosphere of an oxygen concentration of 100 ppm or less, lead oxide (PbO) at the glass surface is reduced to other lead compounds or metal lead (Pb). As a result, the surface of the press-molded glass becomes cloudy. If the molds in such a condition are used repeatedly, a reaction product is generated by the interaction of the mold surface and the lead component of the glass surface on the mold surface so that the mirror property thereof is lost. No effective technique for dissolving the reaction product to return the mold surface to the original mirror surface has been found. Further, apart from this cloudiness, the following disadvantage is observed. That is, the surface of the glass material press-molded with such molds in which the mirror property has been lost is so rough that a mirror surface necessary in a press-molded article cannot be obtained.

As a technique for solving the problem observed when the lead oxide-containing glass is press-molded, Japanese Patent Unexamined Publication Sho-62-162629 discloses a process in which press-molding is carried out while successively increasing the oxygen concentration in the non-oxidizing atmosphere in each of a certain number of molding operations. However, when a lead oxide-containing glass is press-molded by the process described in the Japanese Patent Unexamined Publication Sho-62-162629, the cloudiness of the glass surface cannot be eliminated perfectly. Further, the process has a problem in that deposition of lead on the surfaces of the molds cannot be prevented perfectly.

SUMMARY OF THE INVENTION

An object of the present invention is therefore to provide a process for the production of a molded glass article, which process has advantages that the surface of a molded glass article does not become cloudy even if a glass material containing lead oxide is press-molded, and that lead is not deposited on the surfaces of molds used.

The foregoing object is attained by a process for the production of a molded glass article which comprises the steps of: applying wet treatment to a surface of a lead oxide-containing glass material before press-molding the glass material to produce a molded glass article, thereby forming a hydrated layer having a lower lead oxide content than that of a basic glass constituting a main part of the glass material; heating the glass material having the hydrated layer; and press-molding the heated glass material.

DETAILED DESCRIPTION OF THE INVENTION

Figure 1:
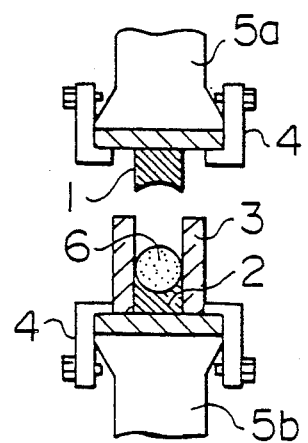
FIG. 1 is a sectional view showing the condition of a press-molding apparatus just before the press-molding of glass.

The hydrated layer is a layer which has a skeleton or backbone of $SiO_2$ and which is rich in the hydronium ion ($H_3O^+$) and poor in the modification ions such as $Pb^{2+}$, said layer being formed by the wet treatment in which the modification ions (including $Mg^2$, $Zn^{2+}$, $Na^+$, etc. together with $Pb^{2+}$) in the glass ion-exchange with the hydronium ion ($H_3O^+$) in the aqueous solution. Because the modification ions in the hydrated layer thus formed is reduced, the refractive index of the hydrated layer is smaller than that of the basic glass (glass in the inside of the glass material where the hydrated layer is not formed) constituting a main part of the glass material. In the hydrated layer, the ion exchange rate toward the direction of the thickness thereof is substantially constant, so that the boundary of the hydrated layer and the basic glass is considerably clear. In short, the hydrated layer is regarded as a kind of thin film layer.

That is, an ion exchange reaction takes place at the glass surface by wet-treating the glass material, so that a hydrated layer having a remarkably lower lead oxide content than the basic glass is formed at the surface of the glass material (in other words, on the basic glass). Accordingly, even though the glass material is press-molded in a non-oxidizing atmosphere of an oxygen concentration of 100 ppm or less, deposition of lead compounds or metal lead is prevented. As a result, not only the molded glass article is free from cloudiness but also the mold surfaces are free from deposition of lead thereon.

The hydrated layer at the glass material surface is formed by the wet treatment. Although pure water may be used in the wet treatment, the ion exchange reaction between the modification ions and the hydronium ion is so slow that pure water is unsuitable for practical use. According to the invention, an acid is preferably used in the wet treatment. Almost all acids can be used except a fluorine-containing acid, because the fluorine-containing acid has the property of dissolving $SiO_2$ as a skeleton or backbone of the glass, so that the rate of forming the hydrated layer is approximately the same as the rate of dissolving the whole glass, whereby adjustment of the treatment condition becomes difficult. In general, when a hydrated layer is to be formed at the surface of a glass material, acids such as an acetic acid, a nitric acid, a hydrochloric acid, etc., are selected suitably, because they are commercially available and can highly dissolve a lead salt formed by the ion exchange reaction.

The acid concentration and the hydrated layer forming rate substantially have a proportional relation. The time required for forming the hydrated layer can be shortened by increasing the acid concentration, but it is preferable that an aqueous solution having an acid concentration of from 0.005N to 2N is used considering proper working speed and safety in handling.

The thickness of the hydrated layer thus formed varies according to the composition, refractive index, shape, etc. of the glass material, but it is preferable that the thickness of the hydrated layer is in a range of from 30 nm to 150 nm. If the hydrated layer is so thick that the thickness of a PbO poor layer (low in lead oxide content) after the press-molding treatment is 150 nm or more, blue interference color which is also called "blue burning" and caused by the difference in refractive index between the PbO poor layer and the basic glass is produced in the molded glass article. On the other hand, if the hydrated layer is so thin that the thickness of the PbO poor layer after the press molding treatment is 30 nm or less, deposition of lead compounds or metal lead on the surface of the glass material cannot be suppressed. As a result, the press-molded glass article becomes cloudy.

The process for the production of a molded glass article according to the present invention will be described hereinbelow by the following examples.

EXAMPLE 1

Three kinds of glass materials [glass sample No. 1 (PbO: 57% by weight, softening point: 470° C.), glass sample No. 2 (PbO: 45% by weight, softening point: 480° C.) and glass sample No. 3 (PbO: 38% by weight, softening point: 480° C.)] having different lead oxide contents were used as glass samples.

The three kinds of glass samples were wet-treated by immersing them in an aqueous nitric acid solution to form hydrated layers at the surfaces of the glass samples (on the basic glasses), respectively. The condition for the acid treatment of the glass samples was as follows.

| Acid Treatment Condition | |
| --- | --- |
| Temperature | 20° C. |
| Time | 20 seconds, 1 minute, 3 minutes, 10 minutes, 30 minutes |
| Acid Concentration | 0.01 N, 0.1 N, 1 N |

Each ten pieces of glass sample Nos. 1, 2 and 3 were wet-treated under combinations of five kinds of treatment times and three kinds of acid concentrations, that is, under fifteen kinds of treatment conditions. That is, 450 glass pieces were produced in total.

After the acid treatment, the glass pieces were dried at a room temperature and then subjected to press-molding treatment, respectively.

Figure 2:
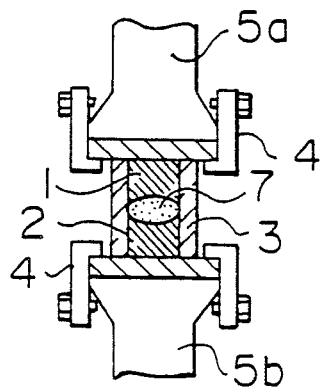
FIG. 2 is a sectional view showing the condition of the press-molding apparatus just after the press-molding of glass.

FIG. 1 is a drawing showing the condition of a press-molding apparatus just before the press-molding of glass. In the drawing, the reference numeral 1 designates an upper mold, 2 a lower mold, 3 a sleeve, 4 mold supporting metal fittings, 5a a press head and 5b a base. A glass sample 6 to be molded is put in a space formed between the lower mold 2 and the sleeve 3. FIG. 2 is a drawing showing the condition of a press-molding apparatus just after the press-molding of glass. A desired molded glass article 7 is produced by pressing down the upper mold 1.

Each ten pieces of lead oxide-containing glass sample Nos. 1, 2 and 3 which had been wet-treated under 15 conditions, i.e. 450 pieces thereof were press-molded in a nitrogen atmosphere using the press-molding apparatus to produce molded glass articles.

The qualities of the press-molded glass articles were evaluated by observing the cloudiness thereof with naked eyes. The results were shown in Table 1.

EXAMPLE 2

Three kinds of glass samples were wet-treated by immersing them in an aqueous hydrochloric acid solution in the same manner as in Example 1 to form hydrated layers at the surfaces of the glass samples, respectively. The conditions for the acid treatment and press-molding treatment of the glass samples were the same as in Example 1.

The qualities of the press-molded glass articles were evaluated by observing the cloudiness thereof with naked eyes. The results were shown in Table 1.

EXAMPLE 3

Three kinds of glass samples were wet-treated by immersing them in an aqueous acetic acid solution in the same manner as in Example 1 to form hydrated layers at the surfaces of the glass samples, respectively. The condition for the acid treatment of the glass samples was as follows.

| Acid Treatment Condition | |
| --- | --- |
| Temperature | 20 |
| Time | 20 seconds, 1 minute, 3 minutes, 10 minutes, 30 minutes |
| Acid Concentration | 0.1 N, 1 N |

Each ten pieces of glass sample Nos. 1, 2 and 3 were wet-treated under combinations of five kinds of treatment times and two kinds of acid concentrations, that is, under ten kinds of treatment conditions. That is, 300 glass pieces were produced in total.

After the acid treatment, the glass pieces were dried and then subjected to press-molding treatment in the same manner as in Example 1.

The qualities of the press-molded glass articles thus produced were evaluated by observing the cloudiness thereof with naked eyes. The results were shown in Table 1.

For comparison, the three kinds of glass samples as mentioned above were press-molded in the same manner as in Example 1, except that the wet treatment was omitted to produce molded glass articles. The qualities of the molded glass articles were evaluated by observing the cloudiness thereof with naked eyes. The results were shown in Table 1.

TABLE 1

| Glass sample No. | PbO content in glass (softening point) | No acid treatment (Comp. Example) | Acid treatment | | | | | | | | |
|---|---|---|---|---|---|---|---|---|---|---|---|
| | | | treatment time | Example 1 (HNO₃) | | | Example 2 (HCl) | | | Example 3 (CH₃COOH) | |
| | | | | 0.01 N | 0.1 N | 1 N | 0.01 N | 0.1 N | 1 N | 0.1 N | 1 N |
| 1 | 57% by weight (470° C.) | X | 20 sec. | X | Δ | ○ | X | Δ | ○ | X | Δ |
| | | | 1 min. | Δ | ○ | * | Δ | ○ | * | X | Δ |
| | | | 3 min. | ○ | ○ | * | ○ | ○ | * | Δ | ○ |
| | | | 10 min. | ○ | * | * | ○ | * | * | ○ | * |
| | | | 30 min. | * | * | * | * | * | * | ○ | * |
| 2 | 45% by weight (480° C.) | X | 20 sec. | X | Δ | ○ | X | Δ | ○ | X | Δ |
| | | | 1 min. | Δ | ○ | ○ | Δ | ○ | ○ | Δ | Δ |
| | | | 3 min. | ○ | ○ | * | ○ | ○ | * | Δ | ○ |
| | | | 10 min. | ○ | ○ | * | ○ | ○ | * | ○ | ○ |
| | | | 30 min. | * | * | * | * | * | * | ○ | * |
| 3 | 38% by weight (480° C.) | X | 20 sec. | Δ | Δ | ○ | Δ | Δ | ○ | Δ | Δ |
| | | | 1 min. | ○ | ○ | ○ | ○ | ○ | ○ | Δ | ○ |
| | | | 3 min. | ○ | ○ | ○ | ○ | ○ | ○ | ○ | ○ |
| | | | 10 min. | ○ | ○ | * | ○ | ○ | * | ○ | ○ |
| | | | 30 min. | ○ | * | * | ○ | * | * | ○ | * |

[Estimation]
X: Cloudy
Δ: More or less cloudy
○: Not cloudy
*: Blue burning

The results shown in Table 1 were summarized as follows.

(1) In the case of no acid treatment, each 10 press-molded glass articles of glass sample Nos. 1, 2 and 3 became all cloudy (as represented by X in Table 1). Further, the surfaces of the molds after the press-molding of 10 glass samples were blurred.

(2) In the case of acid treatment, good results were obtained according to the combinations of acid concentration and treatment time. That is, by selecting a suitable combination of acid concentration and treatment time, the molded glass articles did not become cloudy (as represented by ○ in Table 1). Further, the surfaces of the molds after the press-molding of 10 glass samples were not blurred.

Then, in respect to the glass sample No. 1 (containing 57% by weight of PbO), glass pieces which were acid-treated with an aqueous 0.01N nitric acid solution (20° C.) and glass pieces which were not acid-treated were subjected to X-ray photoelectric spectroscopic analysis to calculate the rate of Pb atomic % to Si atomic % in each sample to thereby determine the film thicknesses of hydrated layers produced. Describing more in detail, the film thicknesses of hydrated layers were determined as follows.

The ratio (Pb/Si) of Pb atomic % to Si atomic % in each of etching depths 15, 30, 45, 60, 75, 90, 105, 120, 135, 150, 165 and 180 nm was calculated by applying X-ray photoelectric spectroscopic analysis to the acid-treated glass pieces.

Then, the Pb/Si ratio in each of said etching depths was calculated by applying X-ray photoelectric spectroscopic analysis to the non-acid-treated glass pieces.

Then, on the assumption that the Pb/Si ratio of the non-acid-treated glass pieces at each etching depth is 1.00, the relative Pb/Si ratio of the acid-treated glass pieces at the same etching depth was calculated.

The results thus obtained were shown in Table 2.

TABLE 2

| X-ray photoelecric spectroscopic analysis | | Relative Pb/Si in acid-treated glass sample | | |
|---|---|---|---|---|
| Etching time | Etching depth | Acid treatment time | | |
| | | 1 min. | 3 min. | 10 min. |
| 5 min. | 15 nm | 0.90 | 0.84 | 0.80 |
| 10 | 30 | 0.96 | 0.89 | 0.85 |
| 15 | 45 | 1.00 | 0.92 | 0.89 |
| 20 | 60 | 1.00 | 0.95 | 0.92 |
| 25 | 75 | | 0.98 | 0.94 |
| 30 | 90 | | 0.99 | 0.96 |
| 35 | 105 | | 1.00 | 0.97 |
| 40 | 120 | | 1.00 | 0.98 |
| 45 | 135 | | | 0.98 |
| 50 | 150 | | | 1.00 |
| 55 | 165 | | | 1.00 |
| 60 | 180 | | | 1.00 |

In Table 2, the fact that the relative Pb/Si in the acid-treated glass sample is less than 1.00 represents that the content of Pb in the acid-treated glass sample is smaller than that in the non-acid-treated glass sample.

In Table 2, the relative Pb/Si in the acid-treated glass sample is low when the etching depth is small. As the etching depth increases, the relative Pb/Si increases and finally reaches to 1.00. In the acid-treated glass sample, the position designated by the etching depth at which the relative Pb/Si is 1.00 is a boundary of the basic glass and the hydrated layer. Here, the etching depth is equivalent to the thickness of the hydrated layer. Seeing Table 2 from such a viewpoint, it is concluded that the thickness of the hydrated layer in the case of the acid treatment time of 1 minute is about 45 nm because the relative Pb/Si in the acid-treated glass sample takes the value of 1.00 at the etching depth of 45 nm. Similarly, it is concluded that the thickness of the hydrated layer in the case of the acid treatment time of 3 minutes is about 105 nm and that the thickness of the hydrated layer in the case of the acid treatment time of 10 minutes is about 150 nm. As a result, it is found that the thickness of the hydrated layer is substantially proportional to the acid treatment time.

It will be derived from Tables 1 and 2 that the object of the present invention can be attained most preferably when the thickness of the hydrated layer is in a range of from 30 nm to 150 nm though the result may vary according to factors such as glass material composition (particularly, lead oxide content), molded shape, etc.

Although Examples 1, 2 and 3 have shown the case where three kinds of acids are used for acid treatment of glass materials, other kinds of acids (except a fluoric acid) such as a sulfuric acid, an oxalic acid, etc. may be used. Although the aforementioned examples have shown the case where a room temperature of 20° C. is used as an acid treatment temperature, the acid treatment time can be more shortened by raising the temperature.

As described above, in the process for the production of a molded glass article according to the present invention, a hydrated layer having a low lead oxide content is formed at the surface of a lead oxide-containing glass material by previously applying wet treatment to the surface of the glass material to be press-molded. Accordingly, the glass surface is free from the production of lead compounds and metal lead during press-molding treatment. Consequently, the molded glass article does not become cloudy. That is, a lead oxide-containing glass articles can be mass-produced simply and stably at a low cost with no necessity of complex atmosphere controller and control software.

What is claimed is:

1. A process for producing a molded glass article comprising the steps of
   (a) applying to the surface of a glass material containing at least 20% by weight lead oxide, an aqueous solution of a non-fluoride containing acid, thereby forming on the glass surface a hydrated layer from 30 nm to 150 nm thick having a lower lead oxide content than that of the glass forming the main part of the glass material;
   (b) heating the surface-treated glass article of step (a); and
   (c) press molding the heated glass article.

2. A process for the production of a molded glass article according to claim 1, wherein the hydrated layer has a skeleton or backbone of $SiO_2$ and is rich in the hydronium ion ($H_3O^+$) and poor in the modification ions, said layer being formed by wet treatment in which the modification ions in the glass ion-exchange with the hydronium ion in the aqueous solution.

* * * * *

UNITED STATES PATENT AND TRADEMARK OFFICE
CERTIFICATE OF CORRECTION

PATENT NO. : 5,141,547
DATED : August 25, 1992
INVENTOR(S) : Asanuma, et. al.

It is certified that error appears in the above-indentified patent and that said Letters Patent is hereby corrected as shown below:

On the Title page, item [73], Assignee: should read --HOYA CORPORATION--.

Signed and Sealed this

Fifth Day of April, 1994

*Attest:*

BRUCE LEHMAN

*Attesting Officer*   *Commissioner of Patents and Trademarks*